(12) United States Patent
Mankowski

(10) Patent No.: US 9,417,667 B2
(45) Date of Patent: Aug. 16, 2016

(54) METHODS AND DEVICES FOR TOUCHSCREEN EAVESDROPPING PREVENTION

(71) Applicant: RESEARCH IN MOTION LIMITED, Waterloo (CA)

(72) Inventor: Peter Mankowski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 398 days.

(21) Appl. No.: 13/891,229

(22) Filed: May 10, 2013

(65) Prior Publication Data

US 2014/0333544 A1  Nov. 13, 2014

(51) Int. Cl.
*G06F 1/16* (2006.01)
*G06F 3/041* (2006.01)
*G06F 3/0488* (2013.01)
*G06F 21/55* (2013.01)
*G06F 1/32* (2006.01)

(52) U.S. Cl.
CPC ............... *G06F 1/1694* (2013.01); *G06F 1/325* (2013.01); *G06F 1/3206* (2013.01); *G06F 1/3215* (2013.01); *G06F 1/3262* (2013.01); *G06F 3/0412* (2013.01); *G06F 3/0416* (2013.01); *G06F 3/04886* (2013.01); *G06F 21/55* (2013.01); *G06F 2200/1636* (2013.01); *G06F 2200/1637* (2013.01); *Y02B 60/32* (2013.01)

(58) Field of Classification Search
CPC ............ G06F 3/041–3/044; G06F 2200/1636; G06F 2200/1637; G06F 1/1694
See application file for complete search history.

(56) References Cited

U.S. PATENT DOCUMENTS

| 2009/0153466 | A1* | 6/2009 | Tilley | 345/156 |
| 2010/0188371 | A1* | 7/2010 | Lowles et al. | 345/178 |
| 2012/0182253 | A1* | 7/2012 | Brosnan | 345/174 |
| 2012/0233658 | A1 | 9/2012 | Piersol | |
| 2013/0111597 | A1 | 5/2013 | Gossweiler et al. | |

FOREIGN PATENT DOCUMENTS

EP  2175345  4/2010

OTHER PUBLICATIONS

Extended European Search Report dated Sep. 26, 2013.
(Continued)

*Primary Examiner* — David Tung
(74) *Attorney, Agent, or Firm* — Rowand LLP

(57) ABSTRACT

Touchscreen controllers and associated electronic devices are described which prevent eavesdropping of touchscreen activity. In one aspect, the present disclosure describes a touchscreen controller that includes a touch input interface for connecting to a touch-sensitive overlay of a touchscreen display and a touch output interface. The touch output interface provides an output in dependence on touch input received via the touch input interface. The touchscreen controller further includes an orientation sensor control output interface for connecting to one or more orientation sensors and an embedded processor coupled with the touch input interface, the touch output interface and the orientation sensor control output interface. The embedded processor is configured to generate an interrupt output signal for output on the orientation sensor control output interface. The interrupt output signal is configured to deactivate the orientation sensor for at least a period of time when the touch-sensitive overlay is activated with touch input.

20 Claims, 5 Drawing Sheets

(56) References Cited

OTHER PUBLICATIONS

The Register, "Andriod app logs keystrokes using phone movements"—The Register Forums, Posted Aug. 17, 2011.
Michael Terrazas, "Georgia Tech Turns iPhone Into spiPhone", Posted Oct. 17, 2011.
TouchLogger: Inferring Keystrokes on Touch Screen From Smartphone Motion, retrieved May 9, 2013.
Christopher Intaglita, "iPhone 4 Accelerometer Enables Device to Be Used for Spying", Updated Oct. 27, 2011.
Ellen Messmer, "Researchers discover keyboard keylogger attack via iPhone", Computerworld, Oct. 19, 2011.
"Researchers Keylog Smartphone Using Its Accelerometer", Aug. 17, 2011.
Matthew DeCarlo, "Your smartphone's accelerometer can capture keystrokes", Oct. 20, 2011.
"Top 10 Keyloggers of 2013", Android App Logs Keystrokes Using Phone Movements, posted Aug. 17, 2011.

* cited by examiner

METHODS AND DEVICES FOR TOUCHSCREEN EAVESDROPPING PREVENTION

TECHNICAL FIELD

The present disclosure relates to electronic devices having touchscreens and, more particularly, to methods and electronic devices which prevent eavesdropping of touchscreen activity.

BACKGROUND

Electronic devices are often associated with a touchscreen display and one or more sensors such as, for example, orientation sensor. By way of example, an electronic device may include a touchscreen display, an accelerometer, and a gyroscope.

The inclusion of orientation sensors, such as accelerometers and gyroscopes, may allow the electronic device to perform any one of a number of orientation-dependent functions which would be difficult or impossible for the electronic device to perform without such sensors. For example, a display orientation may toggle between a landscape orientation or a portrait orientation depending on the physical orientation of the electronic device.

While the inclusion of sensors on an electronic device permits a number enhanced functions to be performed on the electronic device, the inclusion of such sensors may also result in a security vulnerability. More specifically, such sensors may be used to eavesdrop on touchscreen activity. That is, on touchscreen-based electronic devices having orientation sensors, it may be possible to analyze data from the orientation sensors to determine touchscreen activity. For example, using gyroscope and accelerometer data, it is possible to determine, with a high degree of accuracy, the location on a touchscreen display that is being activated. Since the gyroscope and accelerometer data may be used to determine the location of a touchscreen input, a key-logger could, for example, be deployed surreptitiously. That is, current electronic devices may be susceptible to a virus which determines a location of a touch-screen input and maps that location to known locations of letters associated with a virtual keyboard to log keystrokes.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
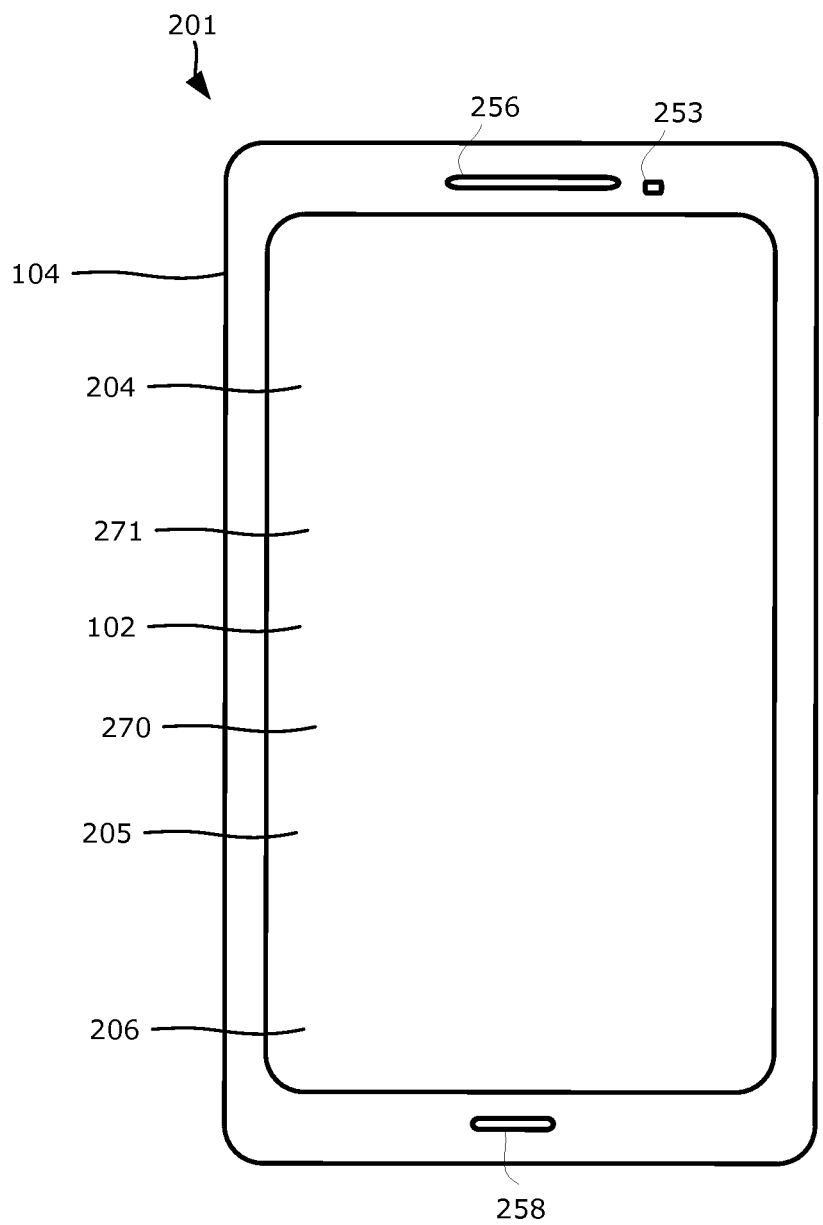
FIG. 1 is a front view of an example electronic device in accordance with example embodiments of the present disclosure.

In one aspect, the present disclosure describes a touchscreen controller. The touchscreen controller includes a touch input interface for connecting to a touch-sensitive overlay of a touchscreen display and a touch output interface. The touch output interface provides an output in dependence on touch input received via the touch input interface. The touchscreen controller further includes an orientation sensor control output interface for connecting to one or more orientation sensors and an embedded processor coupled with the touch input interface, the touch output interface and the orientation sensor control output interface. The embedded processor is configured to generate an interrupt output signal for output on the orientation sensor control output interface. The interrupt output signal is configured to deactivate the orientation sensor for at least a period of time when the touch-sensitive overlay is activated with touch input.

In another aspect, an electronic device is described. The electronic device includes a touchscreen controller. The touchscreen controller includes a touch input interface for connecting to a touch-sensitive overlay of a touchscreen display and a touch output interface. The touch output interface provides an output in dependence on touch input received via the touch input interface. The touchscreen controller further includes an orientation sensor control output interface for connecting to one or more orientation sensors and an embedded processor coupled with the touch input interface, the touch output interface and the orientation sensor control output interface. The embedded processor is configured to generate an interrupt output signal for output on the orientation sensor control output interface. The interrupt output signal is configured to deactivate the orientation sensor for at least a period of time when the touch-sensitive overlay is activated with touch input. The electronic device further includes a display and a touch-sensitive overlay associated with the display. The touch-sensitive overlay connects to the touch-input interface of the touchscreen controller. The electronic device further includes a main processor having an input connected to the touch output interface of the touchscreen controller and an orientation sensor having an orientation sensor output interface coupled to the main processor and an orientation sensor control input interface connected to the orientation sensor control output interface of the touchscreen controller. The orientation sensor is configured to selectively enable the orientation sensor output interface in dependence on a signal received from the orientation sensor control input interface.

Other example embodiments of the present disclosure will be apparent to those of ordinary skill in the art from a review of the following detailed description in conjunction with the drawings.

As will be described in greater detail below, at least some example embodiments of the present disclosure describe electronic devices, methods, communication systems, and computer-readable mediums which include both a touchscreen display and orientation sensors but which prevent eavesdropping of touchscreen input using the orientation sensors.

The electronic device may be any electronic device having a touchscreen including, for example, a smartphone, tablet computer, wearable computer (such as a watch), a mobile telephone or PDA (personal digital assistant), or a computer system. Other types of electronic devices, apart from those specifically listed above, are also possible.

A smartphone is a mobile phone which offers more advanced computing capability than a basic non-smartphone cellular phone. For example, a smartphone may have the ability to run third party applications which are stored on the smartphone.

A tablet computer (which may also be referred to as a tablet) is a mobile computer which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height with is seven inches (7") or more.

Accordingly, the electronic device may take a variety of forms. An example of one such electronic device 201 will now be discussed.

Example Smartphone Electronic Device

Referring now to FIG. 1, a front view of an example electronic device 201 is illustrated. In the example, the electronic device 201 is a smartphone.

The electronic device 201 includes a housing 104 which houses internal components of the electronic device 201 such as a main processor, one or more orientation sensors, etc. Example internal components will be discussed below with reference to FIGS. 2 and 3.

The electronic device 201 includes a touchscreen display 204. The touchscreen display 204 acts as both an output interface 205 and an input interface 206. More particularly, the touchscreen display 204 includes a display 271 which acts as an output interface 205 and touch-sensitive overlay 270 which acts as an input interface 206. The display 271 is disposed within the smartphone so that it is viewable at a front side 102 of the smartphone. That is, a viewable side of the display 271 is disposed on the front side 102 of the smartphone. In the example embodiment illustrated, the display 271 is framed by the housing 104.

The example smartphone also includes a speaker 256. In the example embodiment illustrated, the smartphone includes a single speaker 256 which is disposed vertically above the display 271 when the smartphone is held in a portrait orientation where its height is longer than its width. The speaker 256 may be disposed on the front side 102 of the smartphone.

While the example smartphone of FIG. 1 includes a single speaker 256, in other example embodiments, the smartphone may include a greater number of speakers 256. For example, in at least some example embodiments, the smartphone may include a second speaker 256 which is disposed vertically below the display 271 when the smartphone is held in a portrait orientation where its height is longer than its width (i.e. the orientation illustrated in FIG. 1).

The example smartphone also includes a microphone 258. In the example illustrated, the microphone 258 is vertically disposed below the touchscreen display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone also includes a front facing camera 253 which may be located vertically above the display 271 when the smartphone is held in a portrait orientation where its height is longer than its width. The front facing camera 253 is located so that it may capture images of objects which are located in front of and/or surrounding the front side of the smartphone.

Block Diagram of Example Electronic Device

Figure 2:
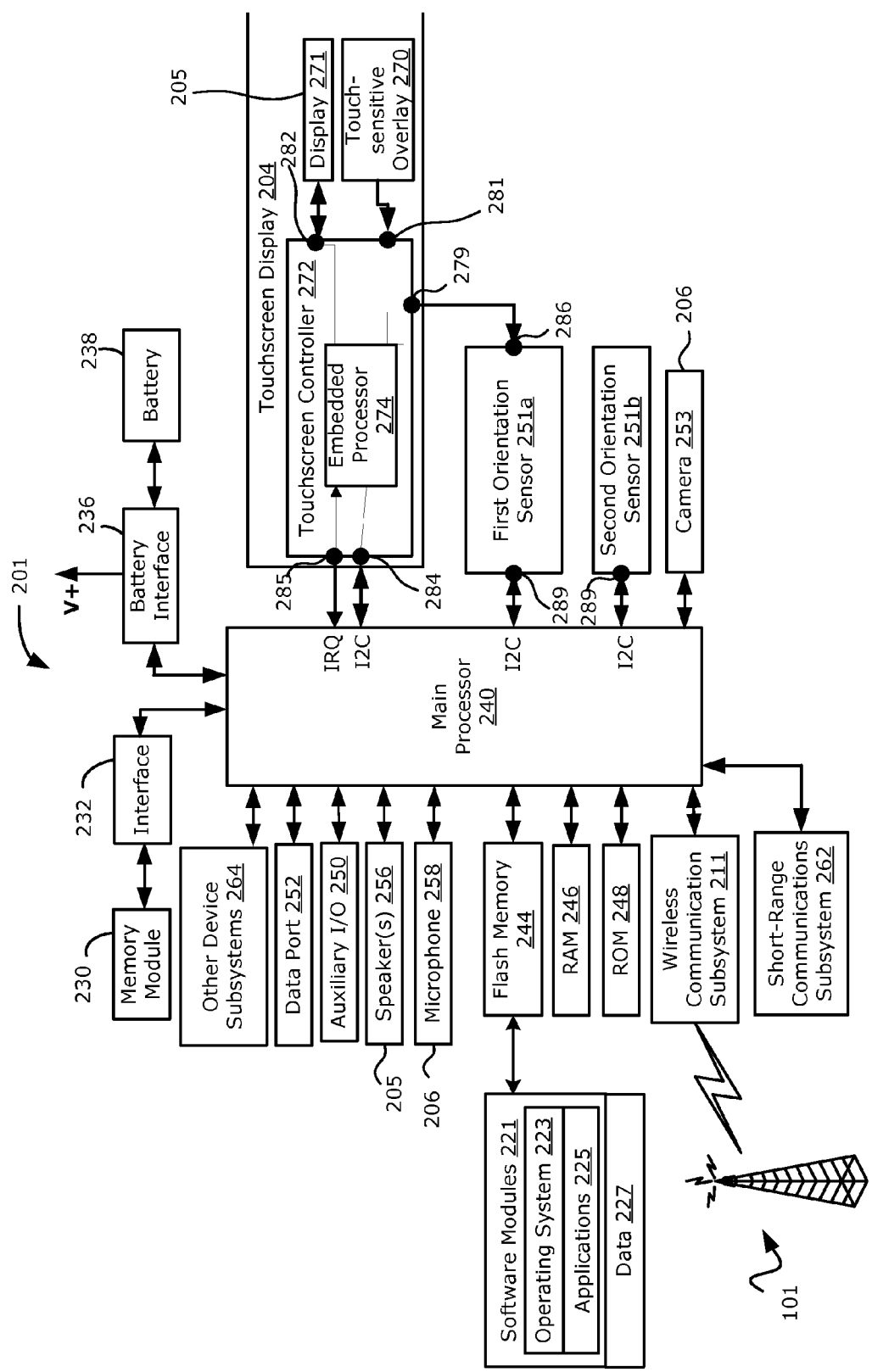
FIG. 2 is a block diagram illustrating an electronic device in accordance with example embodiments of the present disclosure.

Reference will now be made to FIG. 2 which illustrates a block diagram of an example electronic device 201 in which example embodiments described in the present disclosure can be applied.

In the illustrated example embodiment, the electronic device 201 is a communication device and, more particularly, is a mobile communication device having data and voice communication capabilities, and the capability to communicate with other computer systems; for example, via the Internet. For example, the electronic device 201 may be a smartphone of the type described with reference to FIG. 1. It will, however, be appreciated that the electronic device 201 may take other forms, including any one of the forms listed above.

The electronic device 201 includes a main processor 240 (such as a microprocessor) which controls the overall operation of the electronic device 201. The main processor 240 interacts with device subsystems such as a wireless communication subsystem 211 for exchanging radio frequency signals with a wireless network 101 to perform communication functions. The main processor 240 is communicably coupled with additional device subsystems including one or more output interfaces 205 (such as a display 271 (included in a touchscreen display 204) and, in at least some embodiments, a speaker 256), one or more input interfaces 206 (including a touch-sensitive overlay 270 associated with the touchscreen display 204 and, in at least some embodiments, a camera 253 and/or a microphone 258). The main processor 240 is also communicably coupled with one or more one or more orientation sensors 251a, 251b, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), the wireless communication subsystem 211, a short-range communication subsystem 262 and other device subsystems generally designated as 264. Some of the subsystems shown in FIG. 2 perform communication-related functions, whereas other subsystems may provide "resident" or on-device functions.

As noted above, the electronic device 201 may include a touchscreen display 204 which acts as both an input interface 206 (i.e. touch-sensitive overlay 270) and an output interface 205 (i.e. display 271). The touchscreen display may be constructed using a touch-sensitive overlay 270 which is connected to a touchscreen controller 272 and which overlays an associated display 271. The touch-sensitive overlay 270 and the touchscreen controller 272 provide a touch-sensitive input interface 206 and the main processor 240 interacts with the touch-sensitive overlay via the touchscreen controller 272.

The touch-sensitive overlay 270 may have a size which corresponds to the size of the display 271. More particularly, the touchscreen overlay may be sized so that it covers the entirety of the display 271. In at least some example embodiments, the touch-sensitive overlay 270 may have a touch-sensitive input surface which is larger than the display 271. For example, in at least some example embodiments, the touch-sensitive overlay may extend overtop of a frame which surrounds the display 271. In such example embodiments, the frame may be referred to as an active frame since it is capable of acting as an input interface 206. In at least some example embodiments, the touch-sensitive overlay may extend to one or more of the sides of the electronic device 201.

As noted above, in some example embodiments, the electronic device 201 may include a communication subsystem 211 which allows the electronic device 201 to communicate over a wireless network 101. The particular design of the wireless communication subsystem 211 depends on the wireless network 101 in which electronic device 201 is intended to operate.

In some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some example embodiments, the electronic device 201 also includes one or more orientation sensors 251a, 251b. The orientation sensors 251a, 251b are configured to generate orientation data in dependence on the orientation and/or movement of the electronic device 201. In the example embodiment illustrated, the electronic device 201 includes two orientation sensors—a first orientation sensor 251a and a second orientation sensor 251b. In some embodiments, one of these orientation sensors 251a, 251b is an accelerometer and the other of these orientation sensors 251a, 251b is a gyroscope. For example, in some embodiments, the first orientation sensor 251a is an accelerometer and the second orientation sensor 251b is a gyroscope. In other embodiments, the first orientation sensor 251a is a gyroscope and the second orientation sensor 251b is an accelerometer. The first orientation sensor 251a and/or the second orientation sensor 251b may be orientation sensors of other types in other embodiments.

As noted above, in at least some embodiments, one of the orientations sensors 251a, 251b is a gyroscope. A gyroscope measures rotational velocity of the gyroscope. Since the gyroscope is integrated within the electronic device 201 (e.g. within the housing 104 of FIG. 1) and is fixedly connected to the electronic device 201, the gyroscope effectively measures rotational velocity of the electronic device 201.

The gyroscope contains one or more sensing axis. In some embodiments, the gyroscope includes three orthogonal sensing axes, which may be referred to as Gx (to represent the gyroscope's x sensing axis), Gy (to represent the gyroscope's y sensing axis) and Gz (to represent the gyroscope's z sensing axis). Each sensing axis is orthogonal to the other sensing axes. For example, the x sensing axis (Gx) is orthogonal to the y and z sensing axes (Gy and Gz respectively), the y sensing axis (Gy) is orthogonal to the x and z sensing axes (Gx and Gz respectively) and the z sensing axis (Gz) is orthogonal to the x and y sensing axes (Gx and Gy respectively).

The gyroscope may produce a gyroscope reading for each of the sensing axes, Gx, Gy, Gz. For example, a gyroscope reading wx may be produced by the gyroscope based on gyroscope measurements associated with the x sensing axis (such as a rotation about the x sensing axis), a gyroscope reading wy may be produced by the gyroscope based on gyroscope measurements associated with the y sensing axis (such as a rotation about the y sensing axis), and a gyroscope reading wz may be produced by the gyroscope based on gyroscope measurements associated with the z sensing axis (such as a rotation about the z sensing axis). These gyroscope readings collectively form the gyroscope output (which may be referred to, more generically, as orientation sensor output or orientation data). That is, the gyroscope output is an electronic signal which is representative of the gyroscope readings wx, wy, wz for the sensing axes Gx, Gy, Gz of the gyroscope. The electronic signal may, for example, provide the gyroscope readings wx, wy, wz for the sensing axes Gx, Gy, Gz of the gyroscope as measures of an amount of rotation per unit time about each sensing axis. For example, the gyroscope may produce an output in terms of radians per second or degrees per second. The gyroscope output may, in some embodiments, be an analog output. In other embodiments, the gyroscope output may be digital. A gyroscope reading captured at a point in time may be referred to as a gyroscope sample. Such samples may be obtained, for example, at regular intervals, provided the gyroscope is enabled (the enabling and disabling of the gyroscope will be discussed in greater detail below).

The gyroscope output may separate the gyroscope readings for each sensing axis at a signal level or at an output interface level, or both. For example, in some embodiments, the gyroscope may have a separate output interface (such as a separate pad or pin) associated with each sensing axis. Each output interface associated with a sensing axis may provide an output signal representing gyroscope readings for its associated sensing axis (thus separating the gyroscope readings for the sensing axes at an output interface level). In other example embodiments, a common output interface (such as a common pad or pin) may be associated with a plurality of sensing axes. That is, gyroscope readings for a plurality of sensing axes may be provided on a common output interface (such as a common pad or pin). In at least some embodiments, gyroscope output may be provided to the main processor 240 (or to another application-specific processor) via an Inter-Integrated Circuit (I2C) connection associated with that processor. The output interface that is provided on the gyroscope to connect to the processor to provide gyroscope output to the processor may be referred to as an orientation sensor output interface 289.

In some embodiments, the gyroscope may be a digital gyroscope provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The sensing axes Gx, Gy, Gz of the gyroscope may be aligned with the form factor of the electronic device 201. For example, the axes may be aligned such that, when the electronic device 201 is oriented on a flat surface, such as a table, the x and y sensing axes are parallel to the table and the z sensing axis is perpendicular to the table. It is contemplated that the sensing axes x, y, z may be aligned with different features of the electronic device 201 in other embodiments.

As further noted above, in at least some embodiments, one of the orientation sensors 251a, 251b may be an accelerometer. An accelerometer is a device that generates an output signal in dependence on the acceleration of the accelerometer. That is, the accelerometer produces an output which reflects the acceleration of the accelerometer. More particularly, the accelerometer may generate an output which specifies the magnitude and/or direction of acceleration. In the embodiment illustrated, since the accelerometer is integrated within the electronic device 201 (e.g. within the housing 104 of FIG. 1) and is fixedly connected to the electronic device 201, the accelerometer effectively measures the acceleration of the electronic device 201.

In at least some embodiments, the accelerometer output may be provided to the main processor 240 (or to another application-specific processor) via an Inter-Integrated Circuit (I2C) connection associated with that processor.

In some embodiments, the accelerometer may be a digital accelerometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201. The output interface that is provided on the accelerometer to connect to the processor to provide accelerometer output to the processor may be referred to as an orientation sensor output interface 289. This output interface may, for example, be a pad or pin or another type of electrical connector.

The accelerometer defines one or more sensing axis. The accelerometer may, for example, include three orthogonal sensing axes, which may be referred to as Ax (to represent the accelerometer's x sensing axis), Ay (to represent the accelerometer's y sensing axis) and Az (to represent the accelerometer's z sensing axis). Each sensing axis is orthogonal to the other sensing axes. For example, the x sensing axis (Ax) is orthogonal to the y and z sensing axes (Ay and Az respectively), the y sensing axis (Ay) is orthogonal to the x and z sensing axes (Ax and Az respectively) and the z sensing axis (Az) is orthogonal to the x and y sensing axes (Ax and Ay respectively).

The accelerometer may produce an accelerometer reading for each of the sensing axes. For example, an accelerometer reading ax may be produced by the accelerometer based on accelerometer measurements associated with the x sensing axis (such as an acceleration along the x sensing axis), an accelerometer reading ay may be produced by the accelerometer based on accelerometer measurements associated with the y sensing axis (such as an acceleration along the y sensing axis), and an accelerometer reading az may be produced by the accelerometer based on accelerometer measurements associated with the z sensing axis (such as an acceleration along the z sensing axis). These accelerometer readings collectively form the accelerometer output. That is, the accelerometer output is an electronic signal which is representative of the accelerometer readings ax, ay, az for the sensing axes Ax, Ay, Az of the accelerometer. The accelerometer readings with respect to each of the three axes Ax, Ay, Az of the accelerometer can be taken at intervals, which may be predetermined. The intervals for when accelerometer readings can be taken with respect to each of the three axes Ax, Ay, Az can each be independent of the others.

The sensing axes Ax, Ay, Az of the accelerometer may be aligned with the form factor of the electronic device 201. For example, the x and y sensing axes (Ax and Ay) may be generally parallel to the front face of the electronic device and the z sensing axis (Az) may be generally perpendicular to the front face of the electronic device. One or more of the sensing axes Ax, Ay, Az of the accelerometer may be aligned with one or more of the sensing axes Gx, Gy, Gz of the gyroscope.

Thus, the orientation sensors 251a, 251b may generate orientation data based on movement and/or orientation of the electronic device 201. An accelerometer may generate accelerometer data and a gyroscope may generate gyroscope data. This data may be output from the orientation sensors 251, 251b via associated orientation sensor output interfaces 289 (e.g. to the main processor 240), provided the orientation sensors 251a, 251b are enabled.

In at least some embodiments, one or more of the orientation sensors 251a, 251b includes an orientation sensor control input interface 286. In the example illustrated, the first orientation sensor 251a includes the orientation sensor control input interface 286. The orientation sensor control input interface 286 is an electrical connector such as a pad or a pin through which a control signal may be received. The orientation sensor control input interface 286 may be used to control the state of the orientation sensor. More particularly, the orientation sensor control input interface 286 may be used to toggle the orientation sensor between enabled and disabled states. That is, a signal of one type received at the orientation sensor control input interface 286 may instruct the orientation sensor to enter the disabled state (such a signal may be referred to as an interrupt signal) and a signal of another type (or the lack of a signal) may instruct the orientation sensor to enter the enabled state.

Accordingly, an orientation sensor 251a having the orientation sensor control input interface 286 may be configured to selectively enable its orientation sensor output interface 289 in dependence on the signal received from the orientation sensor control input interface. More particularly, the signal received via the orientation sensor control input interface toggles the orientation sensor 251a between multiple states— in an "enabled" state, the orientation sensor operates normally, generating an orientation output at the orientation sensor output interface 289 based on periodic measurements obtained at the sensing axes of the orientation sensor. In contrast, in a "disabled" state, the orientation sensor does not operate normally. That is, at least some orientation data is either not generated while the orientation sensor is disabled, or it is generated but not output. During the disabled state at least some orientation data that would have been output in the enabled state is not output and is irretrievably lost to components (e.g. the main processor 240) connected to the orientation sensor output interface 289.

Accordingly, in at least some embodiments, during the "disabled" state, no record of orientation data is maintained by the orientation sensor. That is, during the disabled state, the orientation sensor does not simply log orientation data until the orientation sensor is once again enabled; orientation data is either not generated, or it is generated but is not output and is not stored in memory for later output. During the disabled state, at least some orientation data which would have otherwise been output (i.e. had the orientation sensor been enabled) is irretrievably lost.

The orientation sensor control input interface 286 is coupled to the touchscreen controller 272 which is included as part of the touchscreen display 204. That is, a connection exists between the orientation sensor control input interface 286 of the orientation sensor 251a and an orientation sensor control output interface 279 of the touchscreen controller 272. The orientation sensor control output interface 279 may, for example, be a pad or pin or an electrical connector of another type which is included in the touchscreen controller 272.

As illustrated in FIG. 2, the touchscreen controller 272 may also include other input and output interfaces in addition to the orientation sensor control output interface 279. These input and output interfaces may also be pads or pins or connectors of other types.

In the example illustrated, the touchscreen controller 272 includes a touch input interface 281 for connecting to the touch-sensitive overlay 270 of the touchscreen display 204. More particularly, the touch-sensitive overlay 270 generates a signal in dependence on touch input received at the touch-sensitive overlay 270. The signal depends on the location of touch-based contact on the touch-sensitive overlay. This signal is provided to the touchscreen controller 272 via the touch input interface 281. In at least some embodiments, the touch input interface 281 of the touchscreen controller 272 may connect to the touch-sensitive overlay 270 using a ribbon connector.

Similarly, in some embodiments, a display interface 282 may connect the touchscreen controller 272 to the display 271. It will be appreciated that, in other embodiments, the display 271 may not connect to the touchscreen controller 272 and the display 271 may connect to the main processor 240 without engaging the touchscreen controller 272.

In at least some embodiments, the touchscreen controller 272 includes one or more touch output interfaces. The touch output interfaces provide an output to the main processor 240 in dependence on touch input received via the touch input interface 281. That is, the touchscreen controller 272 is configured to generate one or more signals which may be output via the touch output interface(s) based on touch input received via the touch-sensitive overlay 270. In the embodiment illustrated, two touch output interfaces are included—a touch output data interface 284 and a touch output interrupt interface 285. The touch output data interface 284 may be a serial interface which provides a signal to the main processor 240 which indicates the location associated with a touch input. That is, the signal indicates the location on the touch-sensitive overlay 270 where an input was received.

The touch output interrupt interface 285 may also provide a signal to the main processor 240 that is related to touch input received at the touch-sensitive overlay 270, but the signal may contain less information than the signal provided via the touch output data interface 284. While the touch output data interface 284 provides data which indicates the location associated with a touch input, the touch output interrupt interface 285 may simply indicate whether the touch-sensitive overlay 270 is engaged/activated. For example, the touch output interrupt interface 285 may provide a binary signal which has two possible states—a first state which indicates that the touch-sensitive overlay is not engaged and a second state (which may be referred to as an interrupt state) which indicates that the touch-sensitive overlay is engaged. For example, when the touch-sensitive overlay 270 is engaged, a signal having the interrupt state may be output to the touch output interrupt interface 285 to effectively instruct the main processor 240 to begin monitoring the touch output data interface 284 for a signal. For example, if the main processor 240 is in a sleep state (which may be a low-power state in which the main processor 240 does not analyze input received from the touch output data interface 284) it may wake up and begin monitoring (e.g. analyzing) the touch output data interface 284.

Any one or more of the interfaces described above may be implemented as a pin, pad or other electrical contact. More particularly, the touchscreen controller 272 may include a housing (not shown) which houses internal components of the touchscreen controller 272 such as, for example, an embedded processor 274. Any one or more of the interfaces described above may be an electrical contact which is externally exposed through an opening in the housing. For example, the orientation sensor control output interface 279 may be externally exposed through an opening in the housing.

The touchscreen controller 272 includes an embedded processor 274. The embedded processor 274 is a processor which is separate and distinct from the main processor 240. The embedded processor 274 is configured to control the state of at least one orientation sensor based on touch input received via the touch-sensitive overlay 270. More particularly, the embedded processor 274 is configured to toggle one or more of the orientation sensors 251a, 251b between the enabled and disabled states based on the touch input. In the embodiment illustrated in FIG. 2, the embedded processor 274 controls the state of the first orientation sensor 251a, but not the second orientation sensor 251b. However, as will be explained in greater below with reference to FIG. 3, in other embodiments, the embedded processor may control the state of more than one orientation sensor 251a, 251b.

To place the first orientation sensor 251a in a disabled state, the embedded processor 274 generates an interrupt output signal and provides that signal to the orientation sensor control output interface 279. In order to do so, the embedded processor 274 is coupled with the orientation sensor control output interface 279. For example, the orientation sensor control output interface 279 may be a pin of the embedded processor 274.

The embedded processor 274 is configured to generate a signal for output via the orientation sensor control output interface 279 based on the state of the touch-sensitive overlay 270. To determine the state of the touch-sensitive overlay 270, the embedded processor 274 is coupled with the touch input interface 281. For example, the touch input interface 281 may be a pin of the embedded processor 274.

The embedded processor 274 may also be coupled with one or more of the touch output interface(s) in at least some embodiments. For example, the embedded processor 274 may be coupled with the touch output data interface 284 and/or the touch output interrupt interface 285 and may generate signals for output via these interfaces.

Accordingly, the embedded processor 274 is, in at least some embodiments, configured to generate an interrupt signal for output on the orientation sensor control output interface 279. The interrupt signal is configured to deactivate the orientation sensor connected to the orientation sensor control output interface 279 for at least a period of time when the touch-sensitive overlay 270 is activated with touch input.

In at least some embodiments, the touchscreen controller 272 monitors for new activations of the touch-sensitive overlay 270. A new activation of the touch-sensitive overlay 270 may be characterized by a transition from a state where the touch-sensitive overlay 270 is not activated to a state where the touch-sensitive overlay 270 is activated. That is, a new activation occurs when a finger (or other object) moves from a position in which it is not in contact with the touch-sensitive overlay 270 to a position in which it is in contact with the touch-sensitive overlay. By way of example, a new activation may occur when a key associated with a virtual keyboard displayed on the display 271 is contacted with the finger. In pressing the key in this manner, the electronic device 201 may be moved slightly and such movement may be reflected in the orientation sensor data generated by the orientation sensors 251*a*, 251*b* if the orientation sensors were allowed to operate in the enabled state. However, in order to prevent such orientation data from being observed at the main processor 240 and being used to eavesdrop on the touchscreen activity, in response to detecting a new activation of the touch-sensitive overlay, the embedded processor 274 may output a signal which causes the orientation sensor 251*a* connected to the orientation sensor control output interface 279 to enter the disabled state.

When the orientation sensor 251*a* is in this disabled state, the output of the orientation sensor 251*a* is affected (as described in greater detail below). That is, the orientation sensor 251*a* ceases to output orientation data and the main processor 240 is prevented from obtaining orientation data which would be obtainable if the orientation sensor 251*a* were not operating in the disabled state. Thus, an application running on the main processor 240 is prevented from obtaining at least some orientation data.

In order to eavesdrop on touchscreen activity using orientation sensors (i.e. to determine the location of a touch-based input based on orientation sensor data), great precision of orientation sensor data may be required. By preventing the main processor 240 from obtaining some of the orientation sensor data that is generated at approximately the same time that the touch-based input is received, such precision is sacrificed, making it difficult or impossible to accurately predict the location of the touch-based input.

Accordingly, in at least some embodiments, the touchscreen controller 272 is used to control the state of the orientation sensor based on the touch input received at the touch-sensitive overlay 270. By utilizing the touchscreen controller 272 to control the state of the orientation sensor based on the touch input, the example electronic device 201 may be less susceptible to a software-based attack than if a similar method were to be implemented on the main processor 240 of the electronic device 201. That is, while a virus may infect the main processor 240, the touchscreen controller 272 is much less likely to be infected. Thus, there may be a reduced risk that a virus may alter the method of disabling the orientation sensor to prevent eavesdropping when the method of disabling the orientation sensor is provided on the touchscreen controller.

Furthermore, by utilizing the touchscreen controller 272 to control the state of the orientation sensor based on the touch-screen data, the orientation sensor may be disabled faster than if the main processor 240 were to control the state of the orientation sensor based on the touch-screen data. The orientation sensor data that is generated at approximately the same time as the touch input or immediately after the touch input may be highly valuable when attempting to predict the location of the touch input. Since the touchscreen controller receives the touch input from the touch-sensitive overlay before the main processor 240, the touchscreen controller is able to disable the orientation quickly. That is, the orientation sensor 251*a* may be disabled very soon after a new activation of the touch-sensitive overlay is detected. By disabling the orientation sensor at this time, orientation data that would be highly valuable for eavesdropping purposes is prevented from being delivered to the main processor 240.

This method of disabling the orientation sensor that may be implemented by the embedded processor will be described in greater detail below with reference to FIGS. 4 to 5.

The electronic device 201 may also include one or more cameras 253. The one or more cameras 253 may be capable of capturing images in the form of still photographs or motion video.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a power source, such as a battery 238. The battery 238 may be one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some example embodiments, the short-range communication subsystem 262 is a wireless bus protocol compliant communication mechanism such as a Bluetooth® communication module to provide for communication with similarly-enabled systems and devices.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The main processor 240 operates under stored program control and executes software modules 221 stored in memory such as persistent memory; for example, in the flash memory 244. As illustrated in FIG. 2, the software modules 221 include operating system software 223 and other software applications 225 such as, for example, third party applications.

The software applications 225 on the electronic device 201 may include a range of applications, including for example, a notepad application, Internet browser application, voice communication (i.e. telephony) application, mapping application, or a media player application, or any combination thereof.

Each of the software applications 225 may include layout information defining the placement of particular fields and graphic elements (e.g. text fields, input fields, icons, etc.) in the user interface (e.g. the display 271) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the main processor 240 at runtime.

Block Diagram of Further Example Electronic Device

Figure 3:
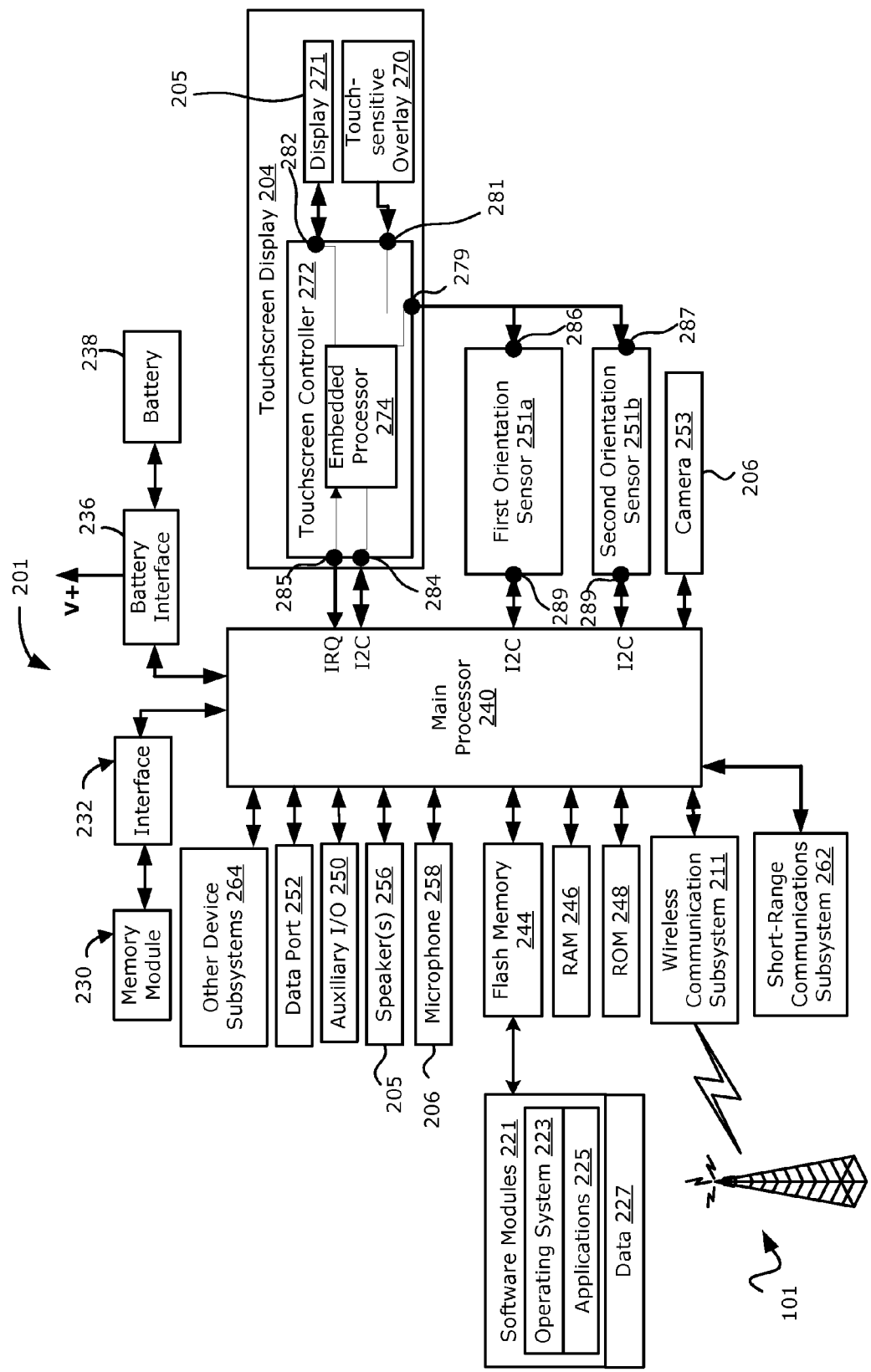
FIG. 3 is a block diagram illustrating a further example electronic device in accordance with example embodiments of the present disclosure.

Reference will now be made to FIG. 3, which illustrates a further example embodiment of the electronic device 201. The block diagram of FIG. 3 includes many of the features described above with reference to FIG. 2. The description of these features will not be repeated at length.

As illustrated in FIG. 3, in at least some embodiments, the orientation sensor control output interface 279 of the touchscreen controller 274 may connect to more than one orientation sensor 251a, 251b. In the example illustrated, the orientation sensor control output interface 279 is connected to both the first orientation sensor 251a and the second orientation sensor 251b. This is in contrast to the electronic device 201 illustrated in FIG. 2 in which the orientation sensor control output interface 279 is connected to a single orientation sensor.

As noted above in the discussion of FIG. 2, the first orientation sensor 251a includes an orientation sensor control input interface 286 which is connected to the orientation sensor control output interface 279 of the touchscreen controller 272. As also noted above, the first orientation sensor 251a is configured to selectively enable or disable the first orientation sensor 251a based on input received at the orientation sensor control input interface 286. Thus, the touchscreen controller 272 enables or disables the first orientation sensor 251a. As noted above, this selective enabling/disabling is based on activity detected at the touch-sensitive overlay 270. More particularly, the first orientation sensor 251a may be disabled when a new activation of the touch-sensitive overlay 270 is detected. As noted in the discussion of FIG. 2 above, a new activation of the touch-sensitive overlay 270 may be characterized by a transition from a state where the touch-sensitive overlay is not activated to a state where the touch-sensitive overlay is activated. Since a new activation causes a movement of the electronic device 201 which may be reflected in the orientation data produced by an orientation sensor that is enabled on the electronic device, the first orientation sensor may be briefly disabled in response to detecting a new activation.

In the embodiment of FIG. 3, the second orientation sensor 251b also includes an orientation sensor control input interface 287 which is connected to the orientation sensor control output interface 279 of the touchscreen controller 272. The second orientation sensor is configured to respond to input received at the orientation sensor control input interface 287 in a manner that is similar to the first orientation sensor's response to input received at its orientation sensor control input interface 286. More particularly, the second orientation sensor 251b is configured to selectively enable or disable the second orientation sensor 251b based on input received at the orientation sensor control input interface 287.

The orientation sensor control input interface 287 is an electrical connector such as a pad or a pin through which a control signal may be received. The orientation sensor control input interface 287 may be used to control the state of the second orientation sensor 251b. More particularly, the orientation sensor control input interface 287 may be used to toggle the second orientation sensor 251b between enabled and disabled states. That is, a signal of one type received at the orientation sensor control input interface 287 may instruct the second orientation sensor 251b to enter the disabled state (such a signal may be referred to as an interrupt signal) and a signal of another type (or the lack of a signal) may instruct the second orientation sensor 251b to enter the enabled state.

Since the touchscreen controller 272 is coupled with the orientation sensor control input interface 287 of the second orientation sensor 251b, the touchscreen controller 272 enables or disables the second orientation sensor 251b. As noted above, this selective enabling/disabling is based on activity detected at the touch-sensitive overlay 270. More particularly, the second orientation sensor 251b may be disabled when a new activation of the touch-sensitive overlay is detected. As noted in the discussion of FIG. 2 above, a new activation of the touchscreen may be characterized by a transition from a state where the touch-sensitive overlay is not activated to a state where the touch-sensitive overlay is activated.

By disabling both the first orientation sensor 251a and the second orientation sensor 251b, the amount of orientation sensor data that is available to the main processor 240 that may relate to movement caused by a touch input is reduced. That is, in the embodiment of FIG. 3, the main processor 240 receives less orientation data than the main processor 240 receives in the embodiment of FIG. 2 since two orientation sensors are disabled in the embodiment of FIG. 3 while only one orientation sensor is disabled in the embodiment of FIG. 2. Since the main processor 240 in the electronic device 201 of FIG. 3 receives less orientation data that may reflect movement associated with the touch input, the task of predicting the location of a touch input is rendered more difficult and less precise for a possible virus deployed on the main processor.

Disabling Orientation Sensor

Figure 4:
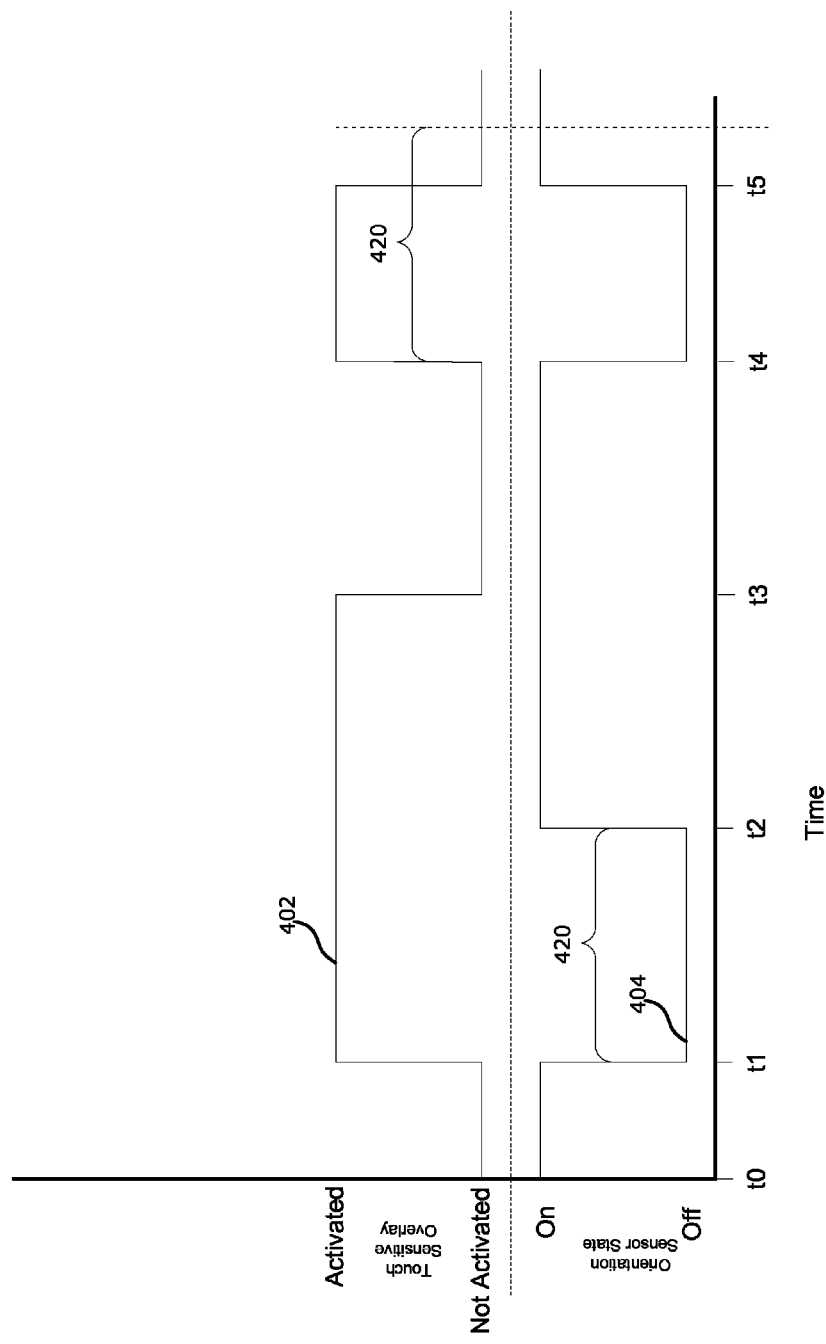
FIG. 4 is a timing diagram illustrating the relationship between input at a touch-sensitive overlay and an orientation sensor state in accordance with example embodiments of the present disclosure.

Reference will now be made to FIG. 4 which illustrates a timing diagram illustrating the relationship between input at the touch-sensitive overlay 270 and the state of the orientation sensor coupled to the touch screen controller 272. More particularly, the touchscreen controller 272 of FIG. 2 or FIG. 3 may be configured to selectively enable or disable the orientation sensor to implement the timing diagram of FIG. 4. As noted above, the embedded processor 274 of the touchscreen controller 272 may be configured to operate according to the timing diagram of FIG. 4.

Two state representations are illustrated in FIG. 4. These include the touch-sensitive overlay state 402 and the orientation sensor state 404. The touch-sensitive overlay state 402 illustrates how the touch-sensitive overlay 270 (FIGS. 2 and 3) may be activated or not-activated. The not-activated state occurs when contact between an object (such as a finger or other detectable object) is not reflected in the output of the touch-sensitive overlay 270. More particularly, during the not-activated state, a finger (or other detectable object) is not in contact with the touch-sensitive overlay 270 and thus, the output from the touch-sensitive overlay 270 indicates that there is no contact between the finger (or other detectable object) and the touch-sensitive overlay 270. In contrast, during the activated state, contact of an object with the touch-sensitive overlay 270 occurs and is reflected in the output of the touch-sensitive overlay 270. For example, during the activated state, a finger (or other detectable object) is in contact with the touch-sensitive overlay 270. The embedded processor 274 is configured to determine whether the touch-sensitive overlay is in the activated or not activated state based on input received via the touch input interface 281 (FIGS. 2 and 3) of the touchscreen controller 272.

The touchscreen display 204 may be configured to pass touchscreen data to the main processor 240 based on data from the touch-sensitive overlay 270. Accordingly, the state of a touch output of the touchscreen display (e.g. to the main processor 240) may correspond to the state of the touch-sensitive display. For example, when the touch-sensitive overlay is activated (e.g. through contact with an object), one or more touch outputs associated with the touchscreen display 204 may provide a signal to the main processor 240 which indicates that the touch-sensitive overlay is activated. For example, a touch output data interface 284 and/or a touch output interrupt interface 285 which connects the main processor to the touchscreen display 204 may provide data to the main processor 240 which indicates that the touch-sensitive overlay is activated. For example, the touch output data interface 284 may provide a signal to the main processor 240 which indicates the location associated with a touch input. Similarly, the touch output interrupt interface 285 may provide a binary signal which has two possible states—a first state which indicates that the touch-sensitive overlay is not engaged and a second state (which may be referred to as an interrupt state) which indicates that the touch-sensitive overlay is engaged.

Since the state of the touch output is based on the state of the touch-sensitive overlay, the touch-sensitive overlay state 402 of FIG. 4 may reflect the state associated with one or more touch outputs such as, for example, the touch output data interface 284 and/or the touch output interrupt interface 285. That is, during periods where FIG. 4 illustrates the touch-sensitive overlay state 402 as being in a "not activated" state, these touch outputs indicate, to the main processor 240, that the touch-sensitive overlay 270 is not activated (i.e. is not in contact with a detectable object). Similarly, during periods where the touch-sensitive overlay state 402 is shown as "activated", these touch outputs indicate, to the main processor 240, that the touch-sensitive overlay 270 is activated. Thus, in at least some embodiments, the touch-sensitive overlay state 402 of FIG. 4 represents both the state of the touch-sensitive overlay 270 and the state of an output interface associated with the touchscreen display which connects to the main processor 240.

The orientation sensor state 404 represents an output state associated with one or more orientation sensors. This output state may be toggled between an enabled state (which is abbreviated as "on" in FIG. 4) and a disabled state (which is abbreviated as "off" in FIG. 4). These states are described above with reference to FIG. 2 and FIG. 3. As noted above, during the disabled state at least some orientation data that would have been output in the enabled state is not output and is irretrievably lost to components (e.g. the main processor 240) connected to the orientation sensor output interface 289. As also noted above, the touchscreen controller 272 is used to control the state of one or more orientation sensor by providing a signal to the orientation sensor(s).

The orientation sensor state 404 of FIG. 4 may represent the state of a single orientation sensor or multiple orientation sensors. As noted in the discussion of FIG. 2 and FIG. 3, the touchscreen controller 272 may control the state of a single orientation sensor 251a, 251b (as illustrated in FIG. 2 where only a first orientation sensor 251a is controlled) or a plurality of orientation sensors 251a, 251b (as illustrated in FIG. 3 where a first orientation sensor 251a and a second orientation sensor 251b are both controlled). Thus, in some embodiments, the orientation sensor state 404 of FIG. 4 represents the state of a single orientation sensor (as in the case of the embodiment of FIG. 2) and in some embodiments, the orientation sensor state 404 of FIG. 4 represents the state of multiple orientation sensors (as in the case of the embodiment of FIG. 3).

The ordinary operating state of the orientation sensor is the "on" state. That is, in ordinary operation the orientation sensor outputs orientation data based on periodic samples obtained at the orientation sensor. Accordingly, at time t0, the orientation sensor state 404 is on. At this time, the touch-sensitive overlay state 402 is not activated. That is, no detectable object is touching the touch-sensitive overlay 270.

Then, at time t1 a new activation of the touch-sensitive overlay is observed. That is, the touch-sensitive overlay transitions from a state where the touch-sensitive overlay 270 is not activated to a state where the touch-sensitive overlay is activated. This transition is detected at the touchscreen controller 272 (e.g. by the embedded processor 274) and the touchscreen controller 272 then switches the state of one or more orientation sensors. More particularly, at t1 the orientation sensor state 404 transitions to the "off" state.

In at least some embodiments, the orientation sensor(s) are only left in the "off" state for a predetermined period of time 420. That is, when placing the orientation sensor in the "off" state, the touchscreen controller 272 may initiate a timer. When the timer indicates that the predetermined period of time 420 has elapsed, the touchscreen controller 272 may switch the orientation sensor back to the "on" state. In the example illustrated, this transition back to the "on" state occurs at time t2. In the example illustrated, at time t2 the touch-sensitive overlay remains activated until time t3.

Then, at time t4 a new activation of the touch-sensitive overlay 270 is observed. In response to this new activation, the orientation sensor(s) are again placed in the "off" state. When this happens a timer may again be initiated at the touchscreen controller 272. However, at t5 the touch-sensitive overlay 272 transitions back to the not activated state (e.g. the finger that was activating the touch-sensitive overlay may be removed) before the predetermined period of time 420 has elapsed. In response, the touchscreen controller 272 may switch the orientation sensor back to the "on" state at t5.

Method of Preventing Eavesdropping of Touchscreen Activities

Figure 5:
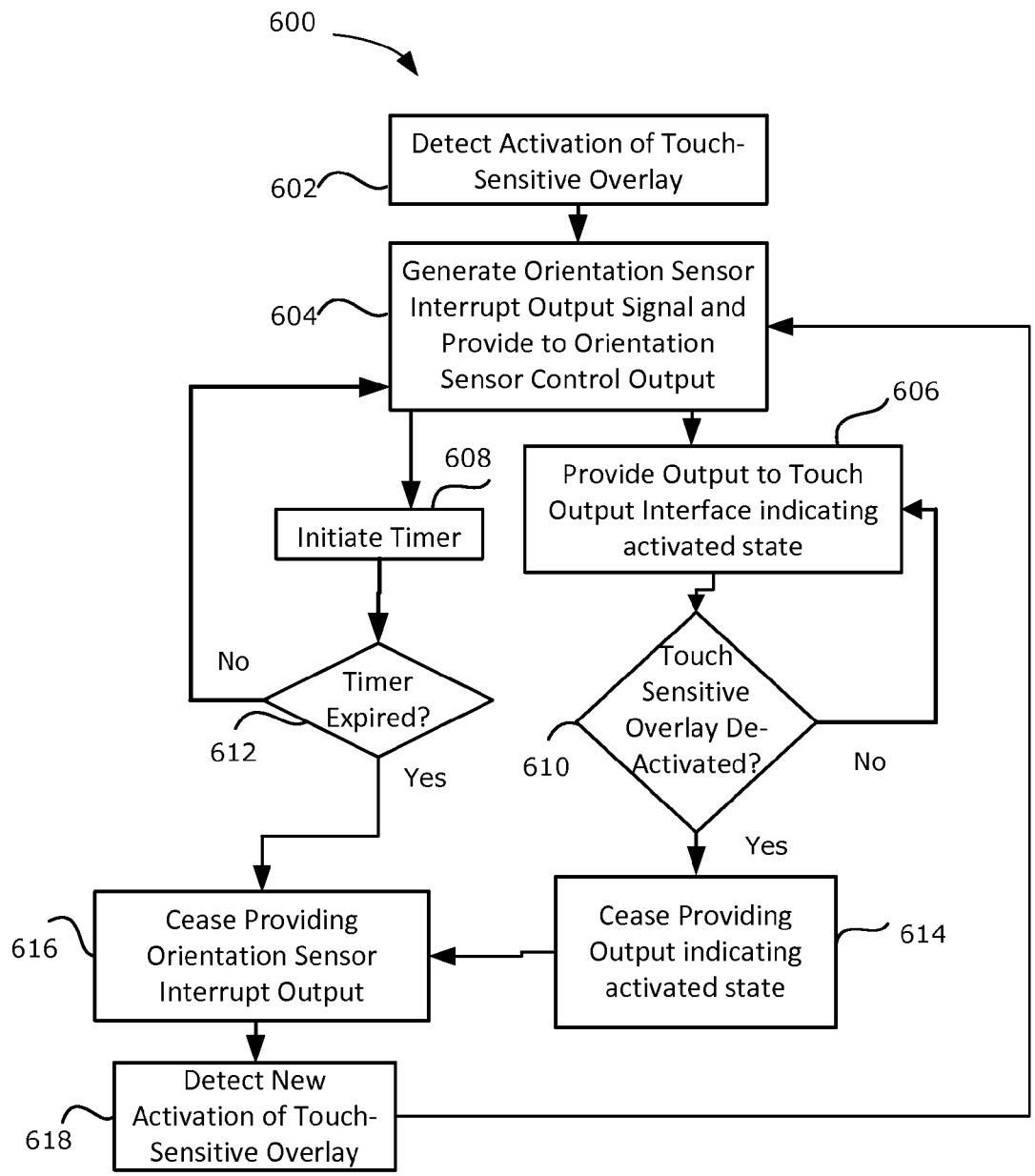
FIG. 5 is a flowchart of a method of preventing eavesdropping of touchscreen activities in accordance with example embodiments of the present disclosure.

Referring now to FIG. 5, a flowchart illustrates a method 600 for preventing eavesdropping of touchscreen activities. The method 600 may, in at less some embodiments, be implemented on a touchscreen controller 272 such as the touchscreen controller 272 of FIG. 2 or 3. For example, an embedded processor 274 of the touchscreen controller 272 may perform the method 600. In some such embodiments, the embedded processor 274 may be associated with processor executable instructions which may configure the embedded processor 274 to perform the method 600. Such processor executable instructions may, for example, be stored on a memory associated with the embedded processor 274.

At 602, an activation of a touch-sensitive overlay is detected when an object such as a finger comes into contact with the touch-sensitive overlay. More particularly, a new activation of the touch-sensitive overlay is detected. The new activation is characterized by a transition from a state where the touch-sensitive overlay is not activated to a state where the touch-sensitive overlay is activated. That is a "new" activation occurs when an object is placed in contact with the touch-sensitive overlay following a period when no objects were in contact with the touch-sensitive overlay.

In response to detecting the activation of the touch-sensitive overlay, at 604, an interrupt output signal is generated and provided to the orientation sensor control output interface 279 (FIGS. 2 and 3) for output to one or more orientation sensors 251a, 251b (FIGS. 2 and 3). The interrupt output signal is configured to deactivate the orientation sensor for at least a period of time when the touch-sensitive overlay is activated with touch input. That is, the interrupt output signal places the connected orientation sensor in the disabled state (also referred to herein as an "off" state or "not activated" state).

Accordingly, the interrupt output signal is provided to the orientation sensor control output interface 279, which provides the signal to the orientation sensor. As will be explained below (with reference to 608 and 612), the interrupt output signal may be provided to the orientation sensor control output interface for a predetermined period of time 420 (FIG. 4).

The touchscreen controller 272 may also provide, at 606, output signals to one or more touch output interfaces (such as a touch output data interface 284 (FIGS. 2 and 3) and/or a touch output interrupt interface 285 (FIGS. 2 and 3)). The output signals relate to the touch-sensitive overlay. More particularly, in response to detecting an activation of the touch-sensitive overlay, the output signal(s) provided to the one or more touch output interfaces indicate that the touch-sensitive overlay is activated.

As noted in the discussion of FIG. 2 above, the touch output data interface 284 may provide a signal to the main processor 240 which indicates the location associated with a touch input.

The touch output interrupt interface 285 may also provide a signal to the main processor 240 that is related to touch input received at the touch-sensitive overlay, but the signal may contain less information than the signal provided via the touch output data interface 284. While the touch output data interface 284 provides data which indicates the location associated with a touch input, the touch output interrupt interface 285 may simply indicate whether the touch-sensitive overlay 270 is engaged/activated.

As illustrated in FIG. 5, in at least some embodiments, step 606 occurs after step 604. More particularly, in at least some embodiments, the touchscreen controller 272 is configured to provide the interrupt output signal to the orientation sensor control output interface 279 before providing an output signal to the orientation touch interface that indicates that the touch-sensitive overlay is activated. That is, before the main processor 240 is able to detect that a touch has occurred, an orientation sensor is instructed to switch to the disabled state.

The touch output interface continues to output a signal that indicates that the touch-sensitive overlay 270 is activated until the touch-sensitive overlay 270 is no longer activated (which may be determined at 610). When the touch-sensitive overlay 270 is no longer activated, the touchscreen controller 272 ceases (at 614) providing an output to the main processor which indicates that the touch-sensitive overlay is activated.

For example, in some embodiments, when a finger is removed from the touch-sensitive overlay 270, the touch output interfaces (such as a touch output data interface 284 (FIGS. 2 and 3) and/or a touch output interrupt interface 285 (FIGS. 2 and 3)) may output no signal or may output a signal which indicates to the main processor 240 that the touch-sensitive overlay is not activated.

When the touch-sensitive overlay 270 is no longer activated, the orientation sensor control output interface 279 may, at 616, cease providing an orientation sensor interrupt output. That is, the touchscreen controller 272 may switch the orientation sensor back to the enabled state.

In at least some embodiments, the orientation sensor may also be switched back to the enabled state if it has been in the disabled state for at least a predetermined period of time 420 (FIG. 4). More particularly, when the interrupt output signal is provided to the orientation sensor control output to switch the orientation sensor to the off/disabled state, a timer may be initiated on the touchscreen controller (at 608). At 612, the touchscreen controller determines whether the timer has expired. The timer expires when a predetermined period of time 420 (FIG. 4) has elapsed. Accordingly, the touchscreen controller 272 determines whether the orientation sensor has been in the off state for at least the predetermined period of time. If the predetermined period of time has not elapsed, then the orientation sensor is left in the "off" state. For example, the interrupt output signal may be continued to be provided to the orientation sensor. However, following the predetermined period of time (i.e. when the timer has expired at 612 by reaching the predetermined period of time 420 (FIG. 4)), the touchscreen controller ceases (at 616) to provide the interrupt output signal to the orientation sensor control output interface. That is, the orientation sensor is switched back to the "on" state.

The predetermined period of time 420 may be selected to be sufficiently long so that a precise orientation or movement of the electronic device 201 may not be determined but sufficiently short so that a more imprecise orientation or movement of the electronic device 201 may be obtained. Since great precision of orientation/movement information is required in order to predict the location of a touch based on orientation data, but such precision may not be required for other purposes (such as switching between portrait and landscape mode), a predetermined period of time may be selected which renders it difficult or impossible to eavesdrop on touchscreen activity, but which allows other orientation/movement dependent functions to be performed. By way of example, in some embodiments, the predetermined period of time is in the range of 10 ms to 100 ms. In some embodiments, the predetermined period of time may be in the range of 40 ms to 60 ms. In some embodiments, the predetermined period of time may be approximately 50 ms.

Thus, in at least some embodiments, the orientation sensor may be switched back to the "on" state when either 1) it has been in the "off" state for at least a predetermined period of time; or 2) the touch-sensitive overlay 270 is no longer activated. In at least some embodiments, whichever one of these conditions occurs first causes the orientation sensor to switch back to the "on" state.

At some point after the orientation sensor is switched back to the "on" state, a new activation of the touch-sensitive overlay may again be detected. That is, after ceasing to provide the interrupt output signal, the touchscreen controller 272 may detect a new activation of the touch-sensitive overlay (at 618). The new activation is characterized by a transition from a state where the touch-sensitive overlay is not activated to a state where the touch-sensitive overlay is activated. In response to detecting such a new activation, steps of the method 600 may be repeated. For example, the interrupt output signal may (at 604) again be provided to the orientation sensor control output interface. Thus, in at least some embodiments, the interrupt output signal may be provided to the orientation sensor in response to detecting a new activation of the touch-sensitive overlay.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present disclosure are not limited to any particular operating system, system architecture, mobile device architecture, server architecture, or computer programming language.

The various example embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described example embodiments may be selected to create alternative embodiments included of a sub-combination of features which may not be explicitly described above. In addition, features from one or more of the above-described example embodiments may be selected and combined to create alternative embodiments included of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A touchscreen controller comprising:
a touch input interface for connecting to a touch-sensitive overlay of a touchscreen display;
a touch output interface, the touch output interface providing an output, to a main processor, in dependence on touch input received via the touch input interface;
an orientation sensor control output interface for connecting to one or more orientation sensors; and
an embedded processor coupled with the touch input interface, the touch output interface and the orientation sensor control output interface, the embedded processor configured to:
detect an activation of the touch-sensitive overlay;
in response to detecting an activation of the touch-sensitive overlay,
activate a timer and determine whether a first period of time has elapsed, the timer expiring following the first period of time; and
provide an interrupt output signal for output on the orientation sensor control output interface, the interrupt output signal being configured to deactivate the one or more orientation sensor sensors while the interrupt output signal is being provided by the embedded processor, the interrupt output signal being provided for the duration of the first period of time and the interrupt output signal ceases being provided upon expiration of the timer,
wherein the embedded processor is distinct from the main processor,
wherein the first period of time is a predetermined period of time.

2. The touchscreen controller of claim 1, wherein the embedded processor is further configured to:
in response to detecting the activation of the touch-sensitive overlay,
provide an output signal to the touch output interface indicating that the touch-sensitive overlay is activated.

3. The touchscreen controller of claim 2, wherein the embedded processor is configured to provide the interrupt output signal to the orientation sensor control output interface before providing the output signal to the touch output interface that indicates that the touch-sensitive overlay is activated.

4. The touchscreen controller of claim 1, wherein the embedded processor is configured to, following the first period of time, cease providing the interrupt output signal to the orientation sensor control output interface.

5. The touchscreen controller of claim 4, wherein the embedded processor is further configured to:
after ceasing providing the interrupt output signal, detecting a new activation of the touch-sensitive overlay, the new activation being characterized by a transition from a state where the touch-sensitive overlay is not activated to a state where the touch-sensitive overlay is activated; and
in response to detecting the new activation, providing the interrupt output signal to the orientation sensor control output interface.

6. The touchscreen controller of claim 1, wherein the first period of time is in the range of 10 ms to 100 ms.

7. The touchscreen controller of claim 1, wherein the first period of time is in the range of 40 ms to 60 ms.

8. The touchscreen controller of claim 1, wherein the embedded processor is configured to generate the interrupt output signal in response to detecting a new activation of the touch-sensitive overlay, the new activation being characterized by a transition from a state where the touch-sensitive overlay is not activated to a state where the touch-sensitive overlay is activated.

9. The touchscreen controller of claim 1, further comprising a housing which houses the embedded processor and wherein the orientation sensor control output interface comprises an electrical contact externally exposed through an opening in the housing.

10. An electronic device comprising:
a touch-screen display having a touch-sensitive overlay and a touchscreen controller coupled to the touch-sensitive overlay;
a main processor having an input connected to a touch output interface of the touchscreen controller; and
an orientation sensor having an orientation sensor output interface coupled to the main processor and an orientation sensor control input interface, the orientation sensor being configured to selectively enable the orientation sensor output interface in dependence on a signal received from the orientation sensor control input interface, the touchscreen controller comprising:
- a touch input interface for connecting to the touch-sensitive overlay; a touch output interface, the touch output interface providing an output, to the main processor, in dependence on touch input received via the touch input interface;
- an orientation sensor control output interface coupled to the orientation sensor control input interface of the orientation sensor; and
- an embedded processor coupled with the touch input interface, the touch output interface and the orientation sensor control output interface, the embedded processor configured to:
  - detect an activation of the touch-sensitive overlay;
  - in response to detecting an activation of the touch-sensitive overlay,
    - activate a timer and determine whether a first period of time has elapsed, the timer expiring following the first period of time; and
    - provide an interrupt output signal for output on the orientation sensor control output interface, the interrupt output signal being configured to deactivate the orientation sensor while the interrupt output signal is being provided by the embedded processor, the interrupt output signal being provided for the duration of the first period of time and the interrupt output signal ceases being provided upon expiration of the timer,
wherein the embedded processor is distinct from the main processor,
wherein the first period of time is a predetermined period of time.

11. The electronic device of claim 10, wherein the orientation sensor is a gyroscope.

12. The electronic device of claim 10, wherein the orientation sensor is an accelerometer.

13. The electronic device of claim 10, further comprising a second orientation sensor having an orientation sensor output interface connected to the main processor.

14. The electronic device of claim 13, wherein the second orientation sensor further comprises an orientation sensor control input interface connected to the orientation sensor control output interface of the touchscreen controller.

15. The electronic device of claim 13, wherein the second orientation sensor is not coupled with the orientation sensor control output interface of the touchscreen controller.

16. The electronic device of claim 10, wherein the embedded processor is further configured to:
   in response to detecting the activation of the touch-sensitive overlay,
      provide an output signal to the touch output interface indicating that the touch-sensitive overlay is activated.

17. The electronic device of claim 16, wherein the embedded processor is configured to provide the interrupt output signal to the orientation sensor control output interface before providing the output signal to the touch output interface that indicates that the touch-sensitive overlay is activated.

18. The electronic device of claim 10, wherein the embedded processor is configured to, following the first period of time, cease providing the interrupt output signal to the orientation sensor control output interface.

19. The electronic device of claim 18, wherein the embedded processor is further configured to:
   after ceasing providing the interrupt output signal, detect a new activation of the touch-sensitive overlay, the new activation being characterized by a transition from a state where the touch-sensitive overlay is not activated to a state where the touch-sensitive overlay is activated; and
   in response to detecting the new activation, providing the interrupt output signal to the orientation sensor control output interface.

20. The electronic device of claim 10, wherein the first period of time is in the range of 10 ms to 100 ms.

* * * * *